Figure 1:
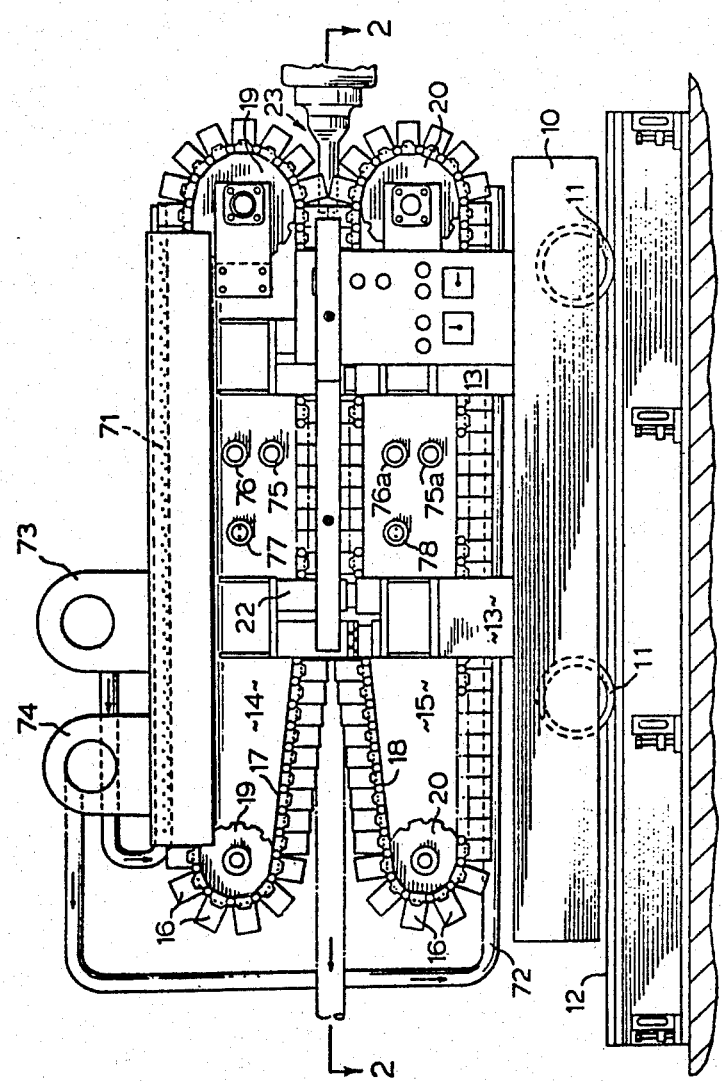

United States Patent [19]

Lupke et al.

[11] Patent Number: 4,510,013

[45] Date of Patent: Apr. 9, 1985

[54] APPARATUS FOR PRODUCING MULTI-WALLED THERMOPLASTIC TUBING

[76] Inventors: Manfred A. A. Lupke, 35 Ironshield Crescent; Gerd P. H. Lupke, 46 Stornoway Crescent, both of Thornhill, Ontario, Canada

[21] Appl. No.: 427,624

[22] Filed: Sep. 29, 1982

[30] Foreign Application Priority Data

Jun. 16, 1982 [CA] Canada ............................. 805321

[51] Int. Cl.³ .................... B32B 31/00; B29B 7/14; A01J 21/02; A23G 1/02
[52] U.S. Cl. ................................. 156/498; 156/501; 156/244.15; 156/244.26; 156/205; 425/378 R; 425/393; 425/396; 264/515
[58] Field of Search ............... 425/381, 467, 378 R, 425/379 R, 393, 396, 327, 325, 326.1, 387.1, 380, DIG. 16, DIG. 248, DIG. 9; 264/515, 510, 508, 507; 156/244.13, 244.14, 244.15, 244.24, 244.22, 244.27, 156, 498, 500, 501, 205, 296, 535, 433, 553, 468, 475, 244.26

[56] References Cited

U.S. PATENT DOCUMENTS

| | | | |
|---|---|---|---|
| 3,538,209 | 11/1970 | Hegler | 264/90 |
| 3,976,414 | 7/1972 | Hegler | 425/381 |
| 4,136,143 | 1/1979 | Lupke et al. | 264/508 |
| 4,165,214 | 8/1976 | Lupke et al. | 425/393 |
| 4,226,580 | 10/1980 | Lupke et al. | 156/244.14 |
| 4,305,703 | 12/1981 | Lupke et al. | 425/380 |
| 4,365,948 | 12/1982 | Chaplain | 264/508 |
| 4,370,187 | 1/1983 | Katagiri et al. | 156/244.26 |

FOREIGN PATENT DOCUMENTS 2403618  8/1975  Fed. Rep. of Germany .
2709395  9/1978  Fed. Rep. of Germany ...... 264/508

Primary Examiner—Edward Kimlin
Assistant Examiner—Louis Falasco

[57] ABSTRACT

In an apparatus for producing multi-walled thermoplastic tubing in which the inner and outer tubing walls are continuously formed by extrusion one within the other, the inner tube being urged outwardly into pressing engagement with the outer tube, the mechanism for urging the inner tube outwardly into securement with the outer tube comprises a mandrel mounted coaxially with the die for extruding the inner tube and on the downstream side of it. The mandrel has an outer surface providing a tapered end portion positioned to receive the inner tube as it is extruded, and a generally cylindrical portion positioned to urge the inner tube into securement with the outer tube. To prevent sticking of the thermoplastic material to the mandrel, the outer surface of the mandrel is maintained at a temperature lower than the molding temperature and is transversely ribbed.

2 Claims, 6 Drawing Figures

APPARATUS FOR PRODUCING MULTI-WALLED THERMOPLASTIC TUBING

This invention relates to an apparatus for producing multi-walled thermoplastic tubing, the apparatus extrusion die for extruding an inner tube of thermoplastic material coaxially within an outer tube as the latter is advanced in an axial direction, and a mandrel mounted coaxially with the die, downstream thereof, for urging the inner tube outwardly into securement with the inner surface of the outer tube, the mandrel having an outer surface positioned to receive the inner tube of thermoplastic from the die and to support the inner tube in pressing relation with the outer tube.

Such apparatus is used to produce, for example, tubing of the type having a corrugated outer wall and a substantially smooth inner wall which is secured thereto. Tubing of this type is used extensively where light weight and high compression strength are desired.

An apparatus of this type is disclosed in Canadian Pat. No. 875,636, issued July 13, 1971 to Wilhelm Hegler. In that apparatus, the extrusion die is formed with a mandrel extension having an enlarged portion over which the inner tube or thermoplastic material is passed so as to be forced into securement with the outer tube while the thermoplastic materials of both tubes are still moldable.

The problem in this apparatus, however, is that the material of the inner tube tends to stick to the mandrel extension. In order to overcome this problem Hegler proposed, in his British Pat. No. 1,439,294, introducing a supporting cushion of pressurized air at elevated temperature between the mandrel extension and the inner tube. However, this solution is unsatisfactory because, quite apart from the complication of providing the additional air supply, elaborate precautions must be taken to control the air pressures on opposite sides of the inner tube, and even then distortion of the inner tube cannot be prevented if the outer tube is of corrugated form.

In our U.S. Pat. No. 4,226,580, dated Oct. 7, 1980 for "Apparatus for Producing Thermoplastic Tubing", we disclose an apparatus including an alternative mechansim for pressing the inner tube into securement with the corrugations of the outer tube. Although this mechanism is a considerable improvement on previous mechanisms employed for the purpose, it has the limitation that it can only engage the inner tube over discrete areas and not over an entire circumferential band, and so the end product may have regions at which the walls are not satisfactorily joined.

In our Canadian Patent application Ser. No. 391,511 filed Dec. 4, 1981, there is described an improved arrangement for mechanically pressing the inner tube into securement with the outer tube, which does not have this drawback. This is more especially suitable for an apparatus used to produce large diameter tubing.

It is an object of the present invention to provide an alternative mechanism for pressing the inner tube into securement with the outer tube. The mechanism may be used instead of the mechanism described in the application identified above, or in the case of large diameter tubing may be used in addition to it to improve the strength of the bond between the tubes where they are secured.

According to the present invention, there is provided, in an apparatus of the type referred to, the improvement comprising transverse ribs on the outer surface of the mandrel and means for maintaining said outer surface of the mandrel at a lower temperature than the second die.

In the accompanying drawings, which illustrate exemplary embodiments of the present invention:

FIG. 1 is a side view of an apparatus in accordance with the invention for producing multi-walled thermoplastic tubing having a corrugated outer wall.

Figure 2A:
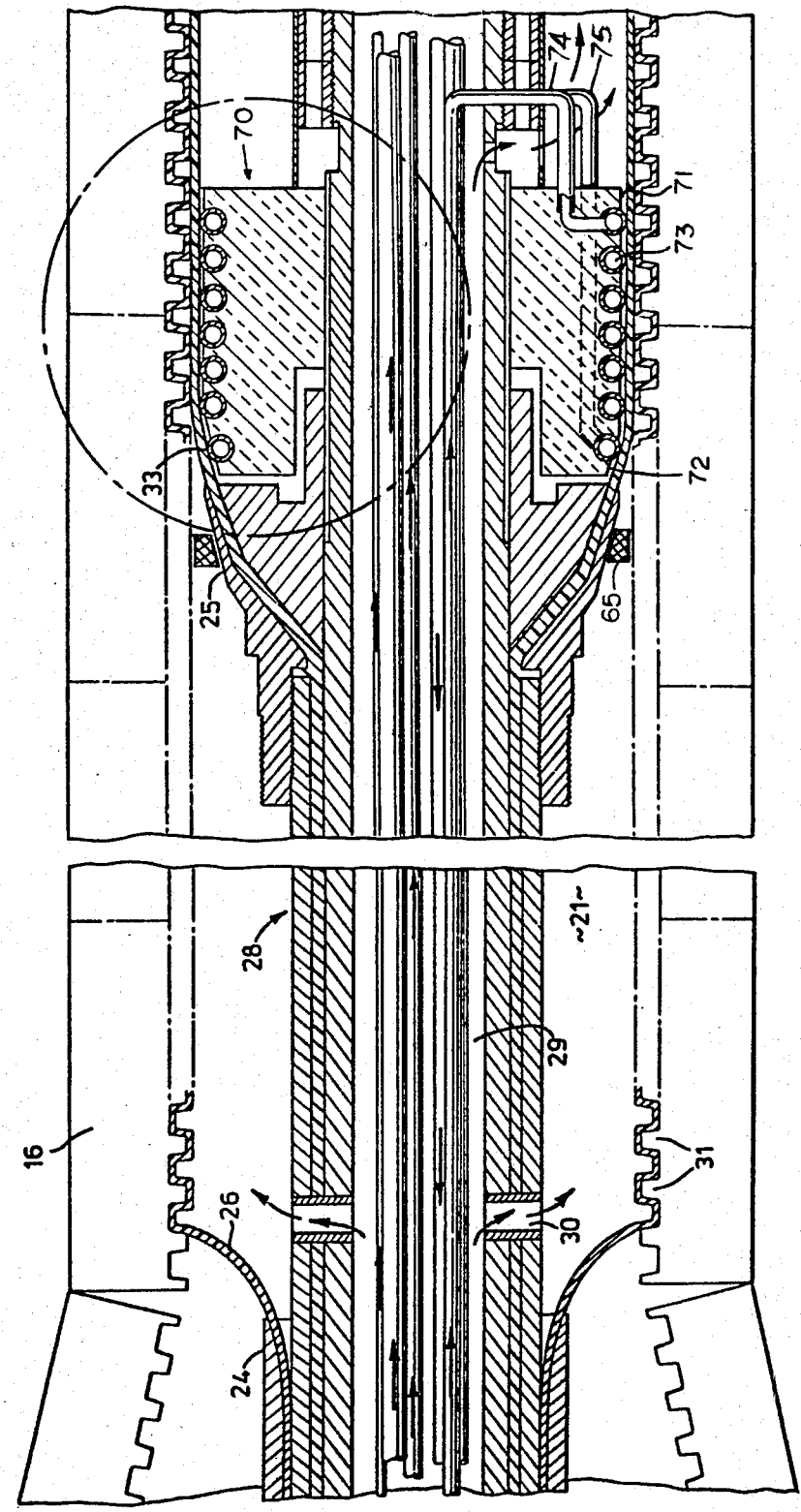
Figure 2B:
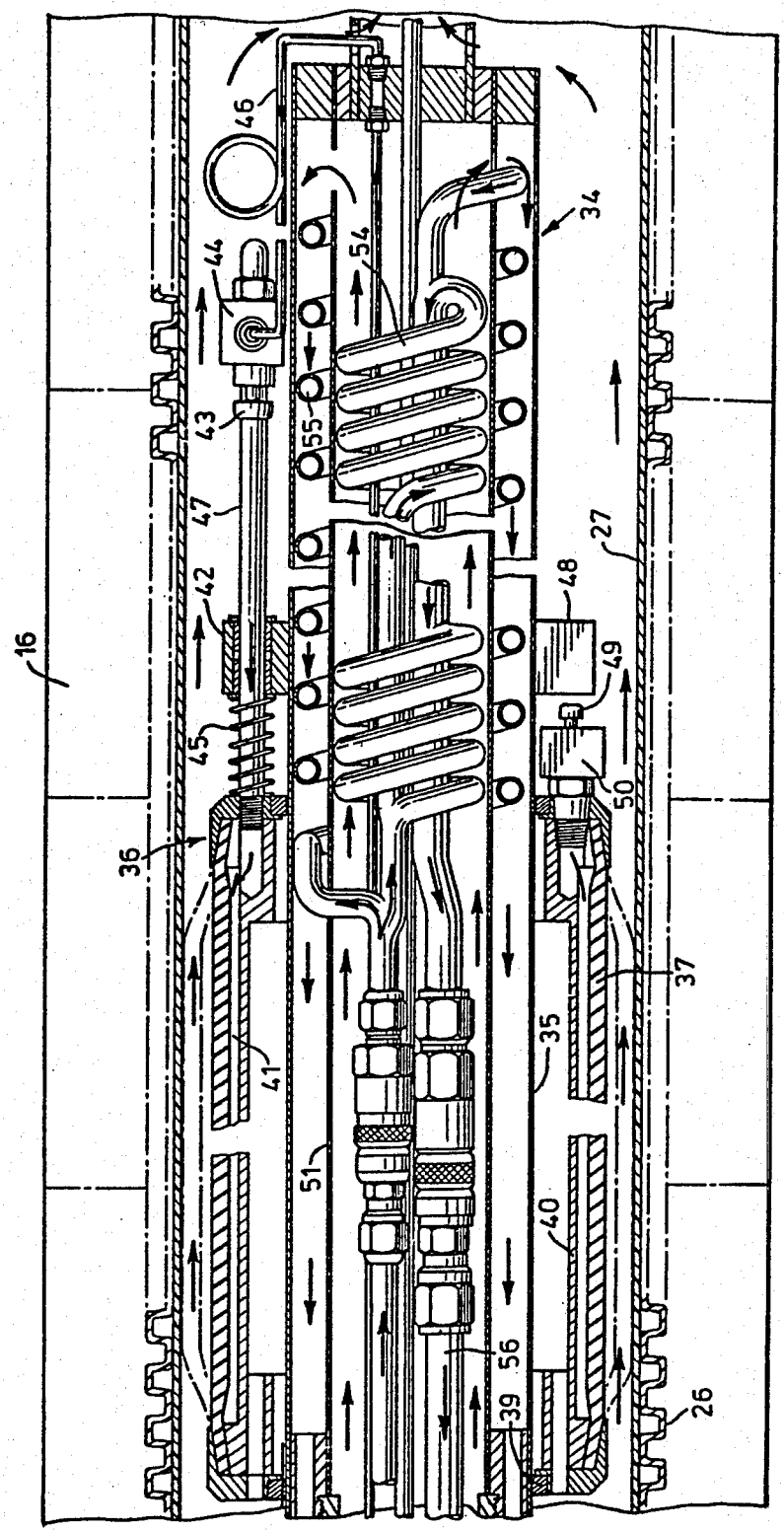
Figure 2C:
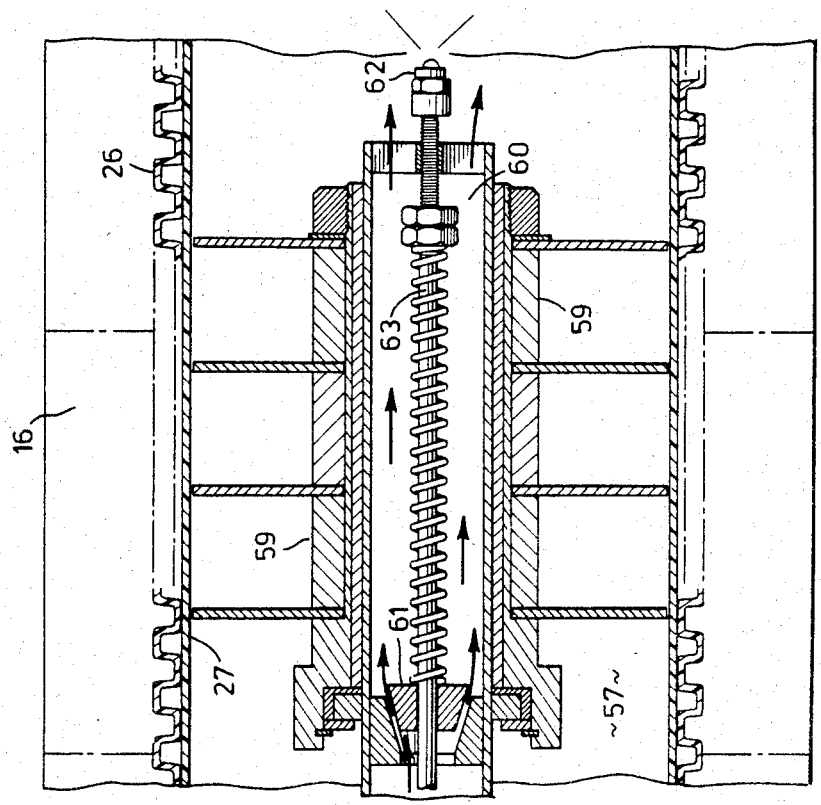
Figure 3B:
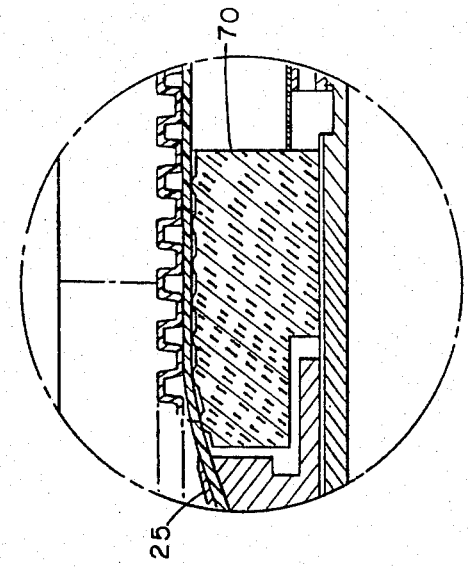
Figure 3A:
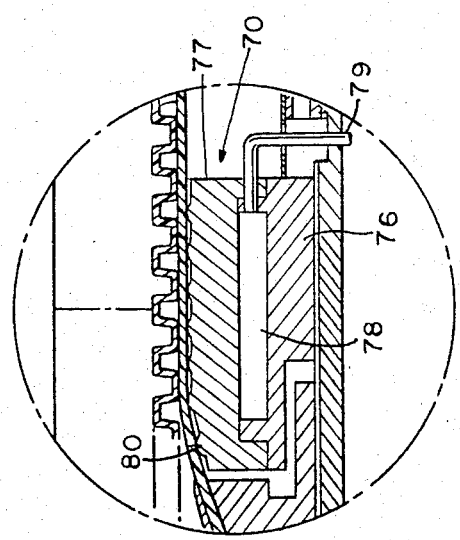

FIGS. 2a, 2b and 2c show, on an enlarged scale, sectional views taken on line 2—2 in FIG. 1, but reading from left to right; and FIGS. 3a and 3b illustrate modifications of a detail of FIG. 2a.

Referring to FIG. 1, the apparatus comprises a wheeled structure including a carriage 10 having wheels 11 which run on tracks 12. A support structure 13 which is mounted on the carriage 10 supports a pair of complementary upper and lower mold assemblies 14 and 15, respectively, each mold assembly comprising an endless train of mold blocks 16 providing half molds. The mold assembly 14 further comprises a pair of transversely spaced endless conveyor chains (only one of which is shown in the drawings and is denoted by the reference numeral 17), with each mold block 16 of the assembly extending transversely between opposed links of these chains. The mold assembly 15 likewise further comprises a pair of endless conveyor chains (only one of which is shown in the drawings and is denoted by the reference numeral 18), with each mold block 16 of the assembly extending transversely between opposed links of this pair of chains. The chains are entrained around pairs of drive sprockets 19, 19 and 20, 20, with drive means (not shown) being connected to at least one of the sprockets 19 and to at least one of the sprockets 20 for operatively driving the mold blocks 16 of each assembly in synchronism so that the mold blocks of each assembly are re-circulated along an endless path defining a forward run and a return run. The half molds co-operate in pairs along the forward run to define a longitudinally extending mold cavity 21 (FIG. 2a).

The support structure 13 includes mechanical jacks 22 interconnecting the upper and lower mold assemblies 14 and 15, these jacks being operable to raise the upper assembly from the lower assembly, when required, to permit easy access for servicing.

By means of the wheeled carriage 10 the mold assemblies 14 and 15 are positioned to locate extrusion head means 23 at the entrance to the mold cavity 21, the extrusion head means being operatively coupled to the nozzle of an extrusion machine (not shown) which may be of conventional form. If required, the mold assemblies 14 and 15 can be moved away from the extrusion head means 23 by movement of the wheeled carriage 10 along the track 12 in order to provide access to the extrusion head means.

As described in our U.S. Pat. No. 4,226,580, identified above, each mold assembly 14, 15 may further comprise an air distributing duct 71, 72 extending along the return run of the mold blocks 16 of the respective mold assembly and positioned to distribute cooling air to the exposed interior molding surfaces of the mold blocks as they travel along the return run. The distributing ducts 71, 72 are each connected to a respective blower 73, 74 by which the cooling air is supplied to them. Each mold assembly 14, 15 further comprises a heat sink provided by a tank through which cooling water may be circulated, inlet and outlet water connections 75, 76 and 75a, 76a being shown. The mold assembly housings may be cooled in this manner during a molding operation; however, in order to avoid wastage of material at the commencement of a molding operation, the water in the housings may be preheated to the required temperature by electrical immersion heaters mounted in the walls of the housings as shown at 77,78.

Referring now to FIGS. 2a, 2b and 2c, the extrusion head means 23 comprises first and second longitudinally spaced annular extrusion dies 24, 25 for forming a first tube of thermoplastic material 26 at a first position within the mold cavity 21, and for forming a second tube of thermoplastic material 27 at a second position within the first tube. An elongated cylindrical support member 28 connected at one end to the extrusion head 23 extends along the generally cylindrical mold cavity 21 defined by the molding surfaces of the mold blocks 16 and provides an internal passage 29 for supplying pressurized air or gas via ports 30 to the space within the newly formed first tube 26. In this way the newly extruded plastic tubing is molded against the surfaces of the half molds 16, which in the present example are shown as having transverse corrugation imparting ribs 31. As will be appreciated by those skilled in the art, instead of molding the tube 26 to form a corrugated outer wall by means of internal gas pressure, the tube may be molded by vacuum forming, in which case ducts would be provided in the mold blocks 16 for connection to a vacuum source. The second tube 27 is extruded from the orifice of the die 25 at a position downstream of the die 24.

As so far described the apparatus is essentially the same as described in our Canadian patent application Ser. No. 391,511. However, in order to press the inner tube of thermoplastic material 27 outwardly into securement with inner surface of the outer tube 26, a mandrel 70 is mounted on the cylindrical support member 28 in close proximity to the mandrel of the die 25 but spaced from it. The mandrel 70 is mounted coaxially with the die 25 on the downstream side thereof. The mandrel 70 has an outer surface providing a generally cylindrical portion 71 and a tapered end portion 72 of frusto-conical form. The tapered end portion 72 is positioned to receive and support the tube 27 of thermoplastic material as it is extruded and lead it towards the cylindrical surface portion 71. The latter is arranged to support the tube 27 in pressing relation with the inner surface of the outer tube 26, thereby to urge the two tubes into securement.

At the point of engagement the hot extruded material of both tubes is still moldable, and so it is necessary to prevent sticking of the material of the inner tube to the mandrel 70 as it is fed over it. It has been discovered that this can be accomplished by cooling the outer surface of the mandrel 70 so as to maintain it at a lower temperature than the molding temperature, while providing the outside surface of the mandrel with transverse ribs to minimize the area of contact with the plastic.

In the embodiment illustrated in FIG. 2a, the mandrel is of thermally non-conductive material, for example polytetrafluoroethylene (PTFE), and a coolant coil 73 is embedded in the mandrel adjacent its outer surface. The turns of the coil project slightly from the outer surface of the mandrel so as to constitute the transferse ribs. Coolant is circulated through the coolant coil, which is connected to a suitable coolant supply (not shown) by pipes 74, 75. It is found that the thermoplastic material does not tend to stick to the mandrel 70 since its interior surface is cooled. However, since the thermoplastic material is a poor conductor of heat, the exterior surface of the inner tube remains sufficiently plastic to effect a bond to the outer tube 26 under the exerted pressure.

In certain applications, more particularly in the production of large diameter tubing, it may be advantageous to strengthen the bond between the inner and outer tubes in a subsequent pressing operation.

The apparatus also includes a heater, shown diagrammatically as an electric heating coil 65, which is mounted on the die 25 immediately before the position at which the plastic is extruded. The purpose of this heating coil is to soften the plastic of the outer tube 26, which may have cooled to some extent, so that the inner and outer tubes can be more satisfactorily welded together.

In the embodiment shown in FIG. 3a, the mandrel 70 is formed in two parts, namely inner and outer metal parts 76, 77, which are fitted together so as to provide an internal cooling chamber 78. Coolant is supplied to the chamber 78 via pipes 79. The outer member 77 has an outer surface providing a generally cylindrical surface portion 71 and a tapered end portion 72 as before, the outer surface being formed with integral transverse ribs 80. Thus the interior surface of the tube of thermoplastic material 27 is forced over a cooled, transversely ribbed surface of the mandrel as in the preceding embodiment so as to be urged outwardly into securement with the outer tube 26.

In the embodiment shown in FIG. 3b, the mandrel 70 is also formed with a transversely ribbed outer surface. However, in this modification the mandrel is not separately cooled by a coolant supply; instead the mandrel is of thermally non-conductive material, for example PTFE, the outer surface being thus thermally insulated from the die 25 and so being at a lower working temperature.

In some embodiments of the invention, particularly those for use in the production of large diameter double-walled tubing, the bond between the inner and outer tubes is further enhanced by a pressing operation subsequent to that provided by the mandrel. This is illustrated in FIGS. 2a, 2b and 2c of the accompanying drawings, wherein the cylindrical support member 28 has a longitudinal extension 34 providing a cylindrical bearing surface 35 on which a shuttle 36 is slidably mounted for reciprocatory movement between first and second limit positions. The shuttle has a radially expansible wall consisting of a sleeve 37 of elastomeric material such as rubber, which is expanded into pressing engagement with the inner tube 27 for forward movement of the shuttle and collapsed at the end of the forward movement to permit return to the shuttle to its starting position.

The shuttle has a pair of longitudinally spaced annular bearing members 38, 39 which slidingly engage the bearing surface 35. The shuttle also includes a cylindrical wall member 40 spaced interiorly of the sleeve 37 to define an annular chamber 41 to which pressurized air or gas it admitted for expanding the sleeve and from which the air or gas is released for collapsing the sleeve.

The first limit position of the shuttle is defined by a fixed stop 42 mounted on the guide member 34, and a stop engaging member 43 which is arranged to engage the stop 42 upon arrival of the shuttle at its first limit position for operating a pneumatic valve 44. The shuttle 36 is biassed towards the first limit position by a compression spring 45 acting between the shuttle and the fixed stop 42. Upon arrival of the shuttle at the first limit position, the valve 44 is opened by the member 43 thus admitting pressurized air or gas from a source (not shown) via a pipe 46 and a supply pipe 47 communicating with the chamber 41. The pipe 47 is rigid and serves to maintain the stop engaging member 43 at a fixed distance from the shuttle 36.

The second limit position of the shuttle is defined by a fixed stop 48 mounted on the guide member 34 and a stop engaging member 49 positioned to engage the stop 48 for actuating a pneumatic valve 50. When the valve 50 is opened, upon arrival of the shuttle at the second limit position, the air or gas is released from the chamber 41, thus collapsing the sleeve and permitting the return of the shuttle to its first limit position in accordance with the bias exerted by the compression spring 45. Thus, in operation, when the shuttle is at the first limit position air or gas is admitted to the chamber 41, and the sleeve 37 is expanded into engagement with the inner tube to urge the tube into pressing engagement with the corrugations of the outer tube 26. The shuttle is then transported by the forward movement of the tubing until the second limit position is reached, at which point the air or gas is released from the chamber 31 and the shuttle is returned to its initial position at which the cycle is repeated.

The cylindrical guide 34 has internal partitions 51 which define a re-entrant flow passage for the flow of cooling gas. Cooling coils 54, 55 located in the inner and outer legs of the re-entrant coolant passage are provided for cooling the gas as it flows therethrough, refrigerant being supplied to the coils through pipes 56.

The cooling gas from an exit 53 (FIG. 2a) flows interiorly of the tubing through a space 57 which is closed at one end by annular baffles 58, the edges of the baffles co-operating with the inner tube and being mounted on a support member 59 extending from the forward end of the member 34. The support member provides an internal passage 60 controlled by a spring loaded relief valve 61 for releasing coolant from the space 57 and so preventing a build up of excessive pressure therein.

Extending from the forward end of the baffle support 59 is an atomizer head 62, to which a cooling liquid such as water is supplied via a pipe 63, the cooling liquid being atomized so as to spray the interior of the multi-walled tubing after it has been formed to promote cooling of the thermoplastic material.

While certain embodiments of the invention have been illustrated and described in detail, it is to be understood that the invention is not limited to those specific embodiments. The scope of the invention is to be ascertained solely by reference to the accompanying claims.

The embodiments of the invention in which an exclusive property or privilege is claimed are defined as follows:

1. An apparatus for producing multi-walled thermoplastic tubing, including an annular extension die for extruding an inner tube of thermoplastic material coaxially within an outer tube as the latter is advanced in an axial direction, and a mandrel mounted coaxially with said die, downstream thereof for urging said inner tube outwardly and pressing the same to secure it to the outer tube, the mandrel being provided with channels for a cooling fluid to cool its outer surface receiving said inner tube from the die, characterized in that said outer surface is provided with transverse ribs for said pressing in point contact manner, to insure high efficient heat transfer, to prevent sticking of the thermoplastic material to said mandrel and particularly for corrugated thermoplastic outer tubing to provide the penetration of the corrugations of the latter into the inner tube.

2. The apparatus of claim 1 wherein said ribs are shaped as a coil of a pipe embedded in the mandrel, the inner chamber of said pipe representing said channels for cooling fluid.

* * * * *